United States Patent [19]

Reeves

[11] Patent Number: 5,682,388
[45] Date of Patent: Oct. 28, 1997

[54] DATA TESTING

[75] Inventor: Malcolm Reeves, Chippenham, United Kingdom

[73] Assignee: Westinghouse Brake and Signal Holdings Limited, United Kingdom

[21] Appl. No.: 565,291

[22] Filed: Nov. 30, 1995

[30] Foreign Application Priority Data

Dec. 2, 1994 [GB] United Kingdom ............ 9424605

[51] Int. Cl.$^6$ .................... G06F 11/00; G01R 31/28
[52] U.S. Cl. ................ 371/3; 371/22.5; 395/898; 395/185.03
[58] Field of Search ............... 371/3, 21.1, 22.1, 371/22.5, 22.6, 27; 395/183.01, 183.15, 183.18, 185.01, 185.02, 185.03, 898; 377/55, 56, 37; 364/933, 933.2, 933.3, 933.7

[56] References Cited

U.S. PATENT DOCUMENTS

| | | | |
|---|---|---|---|
| 3,961,252 | 6/1976 | Eichelberger | 371/21.1 |
| 4,550,387 | 10/1985 | Takita | 364/900 |
| 5,132,974 | 7/1992 | Rosales | 371/22.3 |
| 5,258,985 | 11/1993 | Spence et al. | 371/22.5 |
| 5,513,190 | 4/1996 | Johnson et al. | 371/22.5 |

FOREIGN PATENT DOCUMENTS 2112533  7/1983  United Kingdom.

*Primary Examiner*—Robert W. Beausoliel, Jr.
*Assistant Examiner*—Trinh L. Tu
*Attorney, Agent, or Firm*—Robbins, Berliner & Carson LLP

[57] ABSTRACT

A system is disclosed for testing a plurality of items of test data, the system comprising memory means for storing a plurality of items of stored data and, in response to an input signal identifying one of the items of stored data, producing an output signal dependent on that item of stored data. The input signal is dependent on one of the items of test data and on a feedback signal comprising at least part of the output signal produced on testing a previous item of test data, at least part of the output signal providing an indication of the result of the testing.

9 Claims, 2 Drawing Sheets

DATA TESTING

BACKGROUND OF THE INVENTION

The present invention relates to a system for testing data, for example to test whether the data satisfies predetermined criteria.

There are many situations in which data has to be tested. For example, where a processor is configured to output a stream of data to indicate that the processor is operating correctly there is a need to test the data to check that it is correct. Another such situation is where data relating to the status of a system such as a railway track circuit system has to be tested to ensure that the status is correct.

The present invention provides a means of testing data in such situations.

United Kingdom Patent Application No. 2 112 533 discloses a circuit for detecting that a plurality of signals are generated in a predetermined sequence. The plurality of signals are applied to address terminals of a memory which stores a predetermined pattern, and a divide-by-N-counter (N being a positive integer) counts a first data output signal from the memory and applies the carry output signal to another address terminal of the memory. An output signal of the circuit is derived from a second data output terminal of the memory when the plurality of input signals are generated in a predetermined sequence determined by the predetermined pattern and the number N.

SUMMARY OF THE INVENTION

According to the present invention there is provided a system for testing a plurality of items of test data, the system comprising memory means for storing a plurality of items of stored data and, in response to an input signal identifying one of the items of stored data, producing an output signal dependent on that item of stored data, the input signal being dependent on one of the items of test data and on a feedback signal comprising at least part of the output signal produced on testing a previous item of test data and at least part of the output signal providing an indication of the result of the testing, in which system, when the items of test data follow a predetermined sequence, a subset comprising several of the items of stored data are identified in a predetermined order and if the items of test data do not follow said predetermined sequence then an item of stored data is identified that causes feedback data to be generated that prevents any of said several items of the stored data being identified subsequently.

Preferably, the output signal is a digital signal.

Preferably, the input signal is a digital signal. In this case, preferably the feedback signal is a digital signal and at least one bit of the input signal is derived from a bit of the feedback signal. The test data may be digital, at least one bit of the input signal being derived from a bit of said one of the items of test data.

The part of the output signal that provides an indication of the result of the testing may be of a first form when the items of test data follow one or more predetermined sequences and of a second form otherwise. In this case, said first form may be a regularly alternating signal.

Preferably, the items of stored data in said subset are such as to cause those several items of stored data to be identified in the predetermined order. The items of stored data in said subset may be such as to cause at least some of those several items of stored data to be identified in a repeating order. In such a case, the items of stored data in said subset may be such as to cause not all of those several items of stored data to be identified repeatedly.

The input signal may be dependent on a cross-check signal from another such system.

At least part of the output signal constitutes a cross-check signal for another such system.

DETAILED DESCRIPTION

Figure 1:
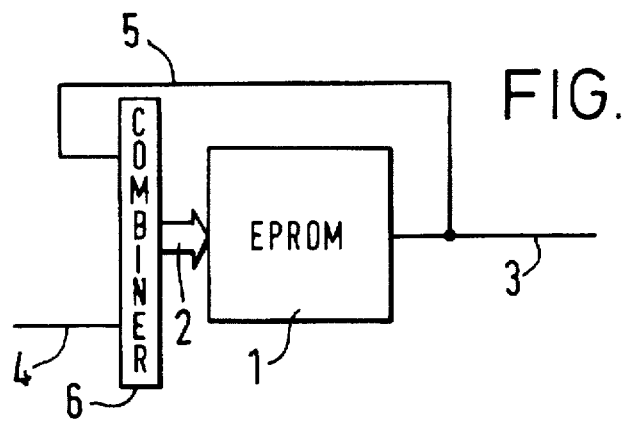
FIG. 1 is a circuit diagram which illustrates schematically a circuit according to the present invention.

FIG. 1 shows an EPROM 1 which stores items of data, whose values are explained in more detail below. The EPROM receives an input address signal at 2 and produces at 3 an output signal dependent on the data stored at the memory location specified by the address signal. The address signal is derived from test data received at 4 and feedback data received at 5. These are combined at 6 to generate the address signal. The feedback data is derived from at least part of a previous output signal from the EPROM.

In operation, as each item of test data is passed to the system an address is derived, a corresponding item of stored data in the EPROM is accessed and an output signal from the EPROM is generated in dependence on that stored data. Feedback data dependent on that output signal are combined with the next item of test data to generate the address of the next item of stored data to be accessed.

The items of data stored in the EPROM are selected so that when the correct sequence of test data is received items of data stored in the EPROM are addressed in a predetermined order and a predetermined form of output data is generated. If the test data is incorrect then a different form of "failure" output data is produced, indicative of incorrect test data.

The test data and feedback data are suitably combined in a bitwise fashion to generate the address signal. In this case, at least one bit of test data and at least one bit of feedback data should be combined.

The selection of the data to be stored in the EPROM will now be discussed in more detail. The stored data suitably defines a path of memory locations (bytes) to be followed. The data stored in each byte of the path generates feedback data which, together with the correct next item of test data, generates the address of the next byte on the path. If the test data is expected to be a repeating set of data then the path may loop back on itself: the last byte of the path may lead to an earlier byte of the path so that at least part of the path may be repeated. The bytes of the EPROM that do not form part of the path are left unprogrammed—for an EPROM they are each therefore all ones (0FFh for an 8-bit EPROM). If incorrect test data is received and one of these unprogrammed locations is addressed then a "failure" output signal will be generated, and the resultant "failure" feedback data will cause the path to continue to be lost as more data is processed (the system will "lock out").

The EPROM is suitably an 8-bit EPROM having at least 14 address lanes, of which 7 could be allocated to bits of received test data and 7 to bits of feedback. These bits are fed unaltered to the corresponding address lines. Of course, not all the address lines need be used, and other ways of allocating the lines could be chosen. A 1MB EPROM would be suitable (giving 3 address lines spare). The first data point of the path should be at the first address to be accessed after a reset—suitably address zero. Charge decay will tend to restore bits of the EPROM to one and this should be taken into account in choosing the path data. For a system in which seven bits of feedback data are used addresses causing lock out are thus generated when the feedback is 07Fh, i.e. all ones. To ensure that lock out will occur even in the event of a failure due to charge decay then 07Fh with a single bit error: 03Fh, 05Fh, 06Fh, 077h, 07Dh and 07Eh should also be lock out values. This leaves 120 allowable feedback values. To keep things simple this could also be the number of path steps. To defect failure as quickly as possible the order of the feedback values should maximise the number of bits that change each step. The values of test data should ideally be 120 different numbers and, again, for greatest integrity, their order should maximise the number of bits that change each step. For greatest integrity the all ones value should not appear in the test data as hardware failure could well produce this. As this is the same specification as for the feedback data the same numbers can be used, although the same numbers from the feedback and test data should not coincide. Each complete address value, the location of each path step, should be more than 1 bit different from any other such address so that multiple bit failures are required to change a valid address to another valid address. The address values chosen should maximise the difference between all address values in the path.

If at any stage there is more than one possible correct value of test data then the path through the EPROM could branch or widen to allow all correct test data values to cause correct output signals.

Forms of memory other than EPROMs could, of course, be used.

Figure 2:
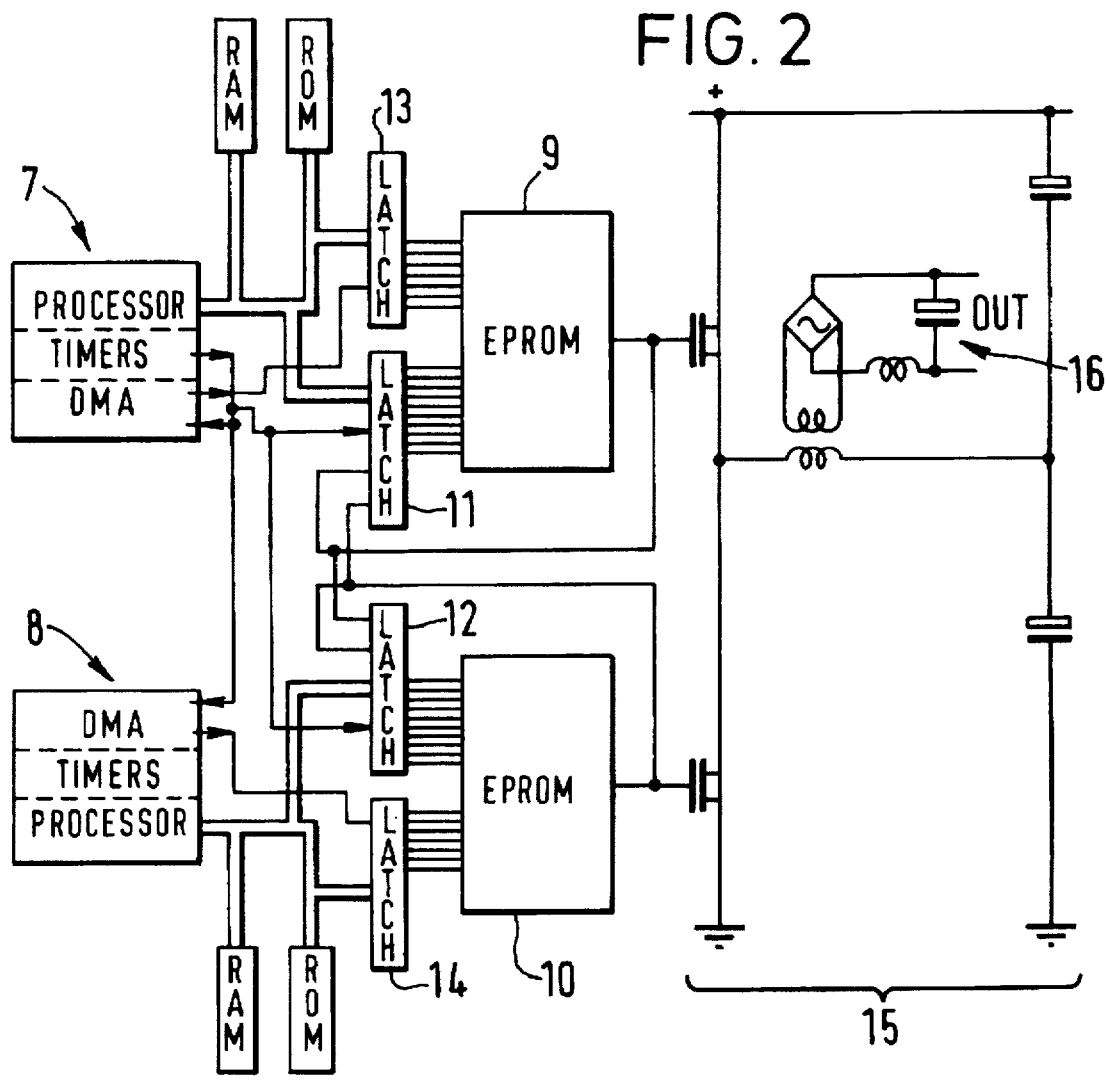
FIG. 2 is a circuit diagram which illustrates a second circuit according to the present invention.

FIG. 2 shows a further development of the circuit shown in FIG. 1. Two processors 7 and 8 duplicate each other's operations, for safety. If the processors fall out of step then the system is assumed to have failed and suitable safety precautions are taken. To check that the processors are in step and duplicating each other's operations, identical sets of test data are loaded in the DMA of each processor by the identical software run by each processor. The data from the DMA of each processor is passed as test data to a respective EPROM 9,10. Of the output from each EPROM 7 bits are passed back to that EPROM as feedback data and 3 of those bits are also passed to the address lines of the other. EPROM as a cross check. The address lines of each EPROM are allocated as follows: 7 to test data, 7 to feedback data and 3 to cross check data.

The eighth output bit from each EPROM is arranged to alternate between 1 and 0 when the correct test data sequence is provided. Each EPROM has a latch 11,12 for its feedback signal, which is clocked by a timer associated with one of the processors, and a latch 13,14 for the test data signal, which is clocked by DMA access. Both processors use a common clock so that the feedback latches change simultaneously. Typical operation is:

| State No. | Processor Data | Feedback 1 Data | Feedback 2 Data | ROM Output level | Output |
|---|---|---|---|---|---|
| 0 | 0 | 0 | 0 | 0 | 0 |
| 1a | P1 | 0 | 0 | R1 | 1 |
| 1b | P1 | R1 | R1 | R2 | 0 |
| 2a | P2 | R1 | R1 | R2 | 1 |
| 2b | P2 | R2 | R2 | R3 | 0 |

In the table, state a is produced by the timer clock and state b by the DMA access. A point to note is that the output, which is a square wave voltage signal, is still the same frequency as the timer and DMA accesses, reducing the load on the processor which would otherwise work twice as hard to produce this frequency. However for increased integrity the output bit can be part of the feedback data. In this case the output is checked but the output frequency is halved.

The output circuit 15 provides a safely derived output voltage signal at 16 indicating whether the correct output is produced from each EPROM. If either EPROM locks out then its output will not be correct and the correct output signal 16 will not be produced.

The processors' software must periodically add more data to the DMA. At these times the processors can make progress checks by counting how much data is left in the DMA and checking that they have taken the correct length of time to perform the operations since the last addition of DMA data. If that length of time is not correct then the processor concerned has detected an error and can act accordingly. The last item of data in DMA should be a value that will force the EPROM to lock out if that value is reached (if the DMA runs out of data due to the processor taking longer than it should to perform a task). Also, the index of the last check needs to be recorded. Then if the software fails to cycle through the check points in the correct order and in the correct time lock out will occur.

Figure 3:
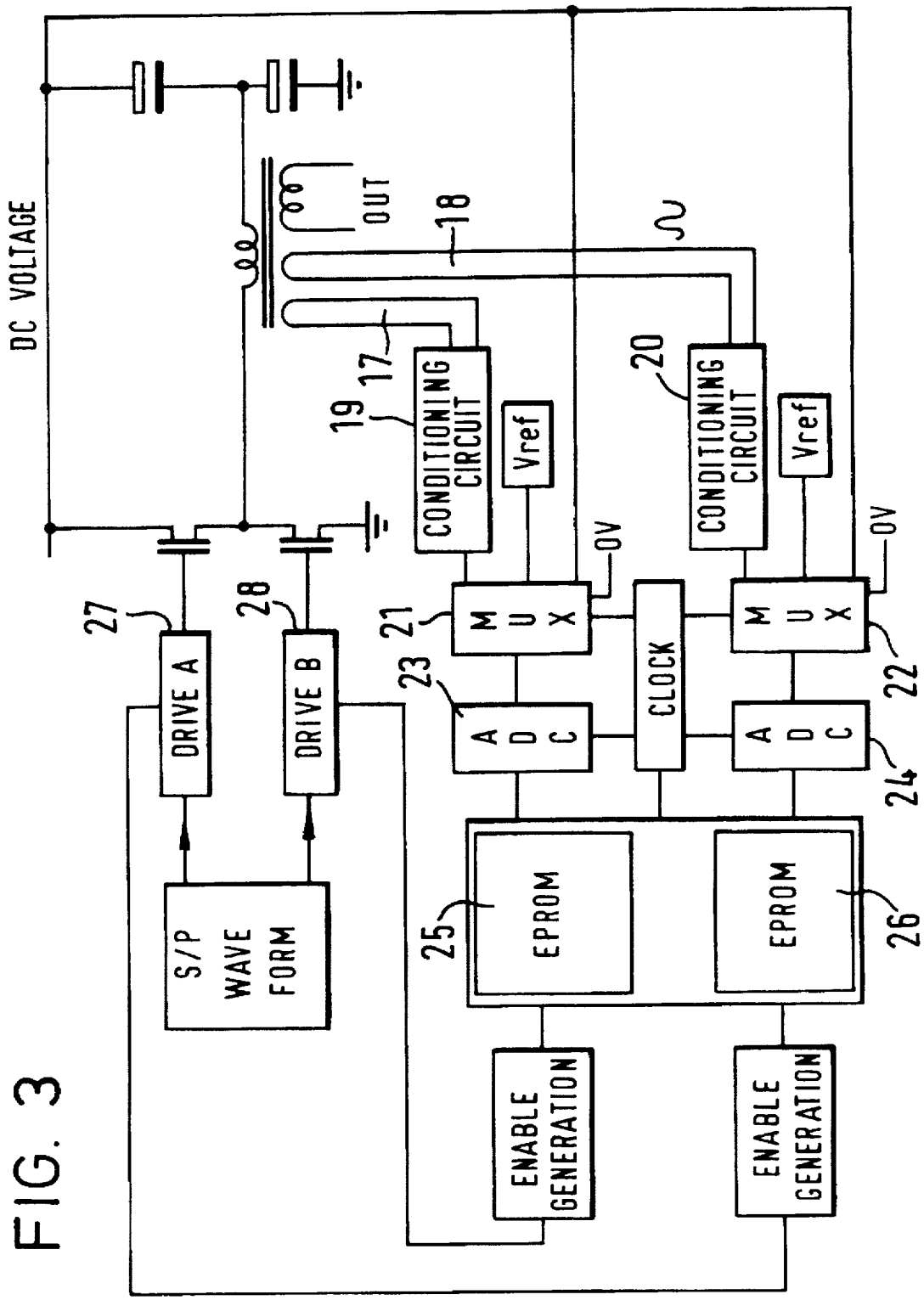
FIG. 3 is a circuit diagram which illustrates a third circuit according to the present invention.

FIG. 3 shows another circuit in which the present invention can be used. The circuit is part of a railway track circuit transmitter. To check that the output is of the correct amplitude, a proportion is passed at 17 and 18 to conditioning circuits 19,20, multiplexers 21,22, analogue-to-digital converters 23,24 and then to EPROMs 25,26 which (using similar circuits to that of FIG. 1) generate enable signals to drive units 27,28 if the correct frequencies are detected.

In more detail, FIG. 3 shows a transmitter in which a non-vital output needs checking to ensure that the output cannot increase. This is done by dual findings and circuits which separately rectify and average the output signal. These, together with the DC rail voltage and test levels are fed via multiplexers 21,22 to ADCs 23,24. The output of each ADC is thus a series of bytes which should match the expected values. These are fed into EPROMs 25,26 for checking. The output of the EPROMs is a dynamic signal which is used to produce an enable voltage for the mosfet drivers. In this situation the width of the path defined in each EPROM needs to be selected to suit the data e.g. narrow (±1 bit) for test levels, wide (<limit) for output level. This last test could lead to dormant failures where one conditioning circuit fails open. The solution is to use cross check feedback between the two EPROMS to compare the values of the two ADC readings of the output level. In other words at this point the path splits into multiple ways to the next point dependent on the value of the ADC. Each EPROM must follow the identical path otherwise the cross check feedback will cause a lock out.

An important feature of a system according to the present invention is the degree of safety which can be achieved. If a 1MB EPROM is used and the path is 120 steps long then the number of address values that are not on the path is vastly greater than the number that are on the path. Thus, the chance of addresses that are generated from incorrect test data continuing to produce a correct output signal is very small.

What is claimed is:

1. A testing arrangement for determining whether a plurality of items of test data follow a predetermined sequence, comprising first and second systems each for sequentially testing a same plurality of items of test data, each of said first and second systems comprising:

memory means for storing a plurality of items of stored data and, in response to an input signal identifying one of the items of stored data, producing an output signal dependent on that item of stored data and including at least portion providing an interim testing result; and identification means for generating said input signal from at least a current item of said test data and from a feedback signal derived from at least a part of the interim testing result that had been previously produced without reference to the current item of said test data, wherein if the items of test data follow said predetermined sequence, then a predetermined subset consisting of more than one but less than all of the items of said stored data are identified by each said identification means in a predetermined order, if the current item of test data does not follow said predetermined sequence, then said identification means only identifies stored data which are not in said predetermined subset in response to the feedback signal, and each of the feedback signals comprises respective components of the interim test results from both said systems, whereby the output signal from the memory means of the first system provides a cross-check component for the input signal to the memory means of the second system, and the output signal from the memory means of the second system provides a cross-check component for the input signal to the memory means of the first system.

2. A testing arrangement according to claim 1, wherein the output signal of the memory means is a digital signal.

3. A testing arrangement according to claim 2, wherein the input signal to the memory means is a digital signal.

4. A testing arrangement according to claim 3, wherein the feedback signal applied to the identification means is a digital signal and at least one bit of the input signal is derived from a bit of the feedback signal.

5. A testing arrangement according to claim 3, wherein the test data is digital and at least one bit of the input signal is derived from a bit of the current item of test data.

6. A testing arrangement according to claim 1, wherein in each of said first and second systems, if the items of test data follow one or more predetermined sequences, the part of the output signal that constitutes the interim test result is of a first form but otherwise is of a second form distinguishable from said first form.

7. A testing arrangement according to claim 6, wherein said first form is a regularly alternating signal.

8. A testing arrangement according to claim 1, wherein, in each of said first and second systems, the items of stored data in the respective subset cause said items of stored data to be identified in the predetermined order.

9. A testing arrangement according to claim 8, wherein, in each of said first and second systems, the items of stored data in the respective subset cause at least some of said items of stored data to be identified in a repeating order.

* * * * *